(12) United States Patent
Groom

(10) Patent No.: US 9,911,132 B2
(45) Date of Patent: Mar. 6, 2018

(54) SYSTEM AND METHOD FOR SEARCHING, ORGANIZING, EXPLORING AND RELATING ONLINE CONTENT

(71) Applicant: John F. Groom, Phoenix, AZ (US)

(72) Inventor: John F. Groom, Phoenix, AZ (US)

( * ) Notice: Subject to any disclaimer, the term of this patent is extended or adjusted under 35 U.S.C. 154(b) by 632 days.

(21) Appl. No.: 14/302,401

(22) Filed: Jun. 11, 2014

(65) Prior Publication Data
US 2014/0344656 A1   Nov. 20, 2014

Related U.S. Application Data

(60) Provisional application No. 61/825,335, filed on May 20, 2013.

(51) Int. Cl.
*G06F 17/00* (2006.01)
*G06Q 30/02* (2012.01)
*G06F 17/30* (2006.01)

(52) U.S. Cl.
CPC ... *G06Q 30/0207* (2013.01); *G06F 17/30058* (2013.01)

(58) Field of Classification Search
CPC ........ G06Q 30/02; G06F 17/212; G06F 17/24
USPC ........................................ 715/202, 255, 200
See application file for complete search history.

(56) References Cited

U.S. PATENT DOCUMENTS

| | | | | |
|---|---|---|---|---|
| 8,762,826 B2 * | 6/2014 | White | ................. | G06Q 10/101 707/740 |
| 2004/0088420 A1 * | 5/2004 | Allen | ..................... | G06Q 30/06 709/229 |
| 2004/0143796 A1 * | 7/2004 | Lerner | ................ | G06F 3/04883 715/234 |
| 2004/0194034 A1 * | 9/2004 | Vlamis | ................... | G06F 17/24 715/255 |
| 2007/0043830 A1 * | 2/2007 | Housenbold | ........... | G06Q 10/10 709/219 |
| 2008/0141108 A1 * | 6/2008 | Matsuura | ................ | G06F 17/24 715/202 |
| 2008/0228866 A1 * | 9/2008 | Minatogawa | ...... | H04N 1/00132 709/203 |
| 2009/0327251 A1 * | 12/2009 | Walmer | ................. | G06Q 30/02 |
| 2012/0096337 A1 * | 4/2012 | White | ................. | G06Q 10/101 715/202 |

(Continued)

OTHER PUBLICATIONS

Zhong et al., MAPO: Mining and Recommending API Usage Patterns, Published 2009, ACM, pp. 1-25 (pdf).*

*Primary Examiner* — Manglesh M Patel
(74) *Attorney, Agent, or Firm* — James M. Smedley LLC; James Michael Smedley, Esq.

(57) ABSTRACT

The present invention generally relates to a web-based system and method for searching, organizing, exploring and relating online content. Specifically, the present invention relates to a unique way to store and relate different types of media to each other. Embodiments of the present invention provide users the ability to identify and save content in a remote location where a remote computing device processes and uses the saved content to dynamically identify and update the content and secondary content associated with the content. Further embodiments of the present invention further allow for the organization and curation of content as well as provide a platform for searching and identifying new content based on the saved content.

17 Claims, 13 Drawing Sheets

(56) References Cited

U.S. PATENT DOCUMENTS

2014/0365851 A1* 12/2014 Kroupa .............. G06F 17/2229
715/205

* cited by examiner

FIG. 8B

SYSTEM AND METHOD FOR SEARCHING, ORGANIZING, EXPLORING AND RELATING ONLINE CONTENT

CROSS-REFERENCE TO RELATED APPLICATIONS

This application claims the benefit of U.S. Provisional Patent Application No. 61/834,843, filed Jun. 13, 2013, and entitled "System and Method for a Media Scrapbook" the entire disclosure of which is incorporated herein by reference.

FIELD OF THE INVENTION

The present invention generally relates to a web-based system and method for searching, organizing, exploring and relating online content. Specifically, the present invention relates to a unique way to store and relate different types of media to each other. Embodiments of the present invention provide users the ability to identify and save content in a remote location where a remote computing device processes and uses the saved content to dynamically identify and update the content and secondary content associated with the content. Further embodiments of the present invention further allow for the organization and curation of content as well as provide a platform for searching and identifying new content based on the saved content.

BACKGROUND

As the amount of data available to individuals becomes greater every passing moment, there is a need to store, organize and structure this data so that individuals can process and review relevant data at their convenience. Currently, data, referring to any type of content, whether audio, textual, graphical, multi-format or in any other form, is accessible across vast networks of websites, software services and other connected providers of content. Content of this form is easy to retrieve, such as via a HTTP request for a webpage to a website or requesting packaged data from an application programming interface (API), but there currently exists no way to easily store and curate the content received from these content providers.

Further, since content is always changing and content providers are always updating content and locations content is stored, it is difficult for individuals to keep track of content they wish to view at a later time. For instance, a website may have a front page story that an individual is interested in reading at a later time, but when they return at that later time, the front page story is changed and they have no easy way to retrieve the location of the content.

The inability to easily store and retrieve content individuals want to later consume is a lost opportunity for both content creator, in terms of financial rewards from exposure (e.g., advertising revenue, conversions) and other non-monetary rewards (e.g., creation of a fan base), and content consumer alike.

Additionally, perceptions of particular types or genres of content are largely predictable or identifiable. If a content consumer likes a particular piece of content of a specific or identifiable type and/or genre (e.g., sci-fi movies), they are likely to enjoy additional content in similar or related types/genres. While currently there are systems which provide recommendations based on content, such as eCommerce providers providing additional goods to users based on past purchases or searches and streaming video providers providing additional video recommendations based on a viewer's previous content views, there are currently no centralized systems that allow for a user to store content that is provided by remote content providers where the centralized system retrieves information from numerous third-party content providers and uses the information retrieved from the third-party content providers (and information stored in the centralized system), to curate and suggest additional content to the user.

Therefore, there is need in the art for a system and method configured to allowing for the searching, organizing, exploring and relating of online content within a contained ecosystem. These and other features and advantages of the present invention, including the generation of web-based multimedia scrapbooks, will be explained and will become obvious to one skilled in the art through the summary of the invention that follows.

SUMMARY OF THE INVENTION

Accordingly, it is an object of the present invention to provide a system and method for the searching, organizing, exploring and relating of online content within a contained ecosystem.

According to an embodiment of the present invention, a system for generating and providing a media scrapbook includes: a scrapbook generation and provision module, comprising computer-executable code stored in non-volatile memory; a processor; and a communications means, wherein said scrapbook generation and provision module, said processor, and said communications means are operably connected and are configured to: receive a content storage request from a user; identify, based on information contained in said content storage request, remote content stored at a remote content provider; retrieve said remote content from said remote content provider; parse said remote content for associated content information; store, at least a portion of said remote content and said associated content information for later retrieval and use by said user.

According to an embodiment of the present invention, the scrapbook generation and provision module, processor, and communications means are further configured to: parse user input data from said content storage request, wherein said user input data is selected from the group comprising user comments, user ratings, edits to prepopulated data and user tags; and store said user input data in relation to the portion of said remote content and said associated content information.

According to an embodiment of the present invention, the associated content information is selected from the group comprising uniform resource locator, internal content category, external content category, user content identifier and global unique identifier.

According to an embodiment of the present invention, the internal content categories are selected from the group comprising movies, books, Internet, performing arts, art, periodicals, music and television.

According to an embodiment of the present invention, the user content identifier is used to associate said remote content and said associated content information with said user.

According to an embodiment of the present invention, the global unique identifier is used to associate said remote content and said associated content information across all users.

According to an embodiment of the present invention, the scrapbook generation and provision module, processor, and communications means are further configured to: receive a content exploration request from said user; identify stored content associated with said content exploration request; retrieve said stored content; identify one or more third-party content providers; generate search parameters for each of said one or more third-party content providers; execute a search on each of said one or more third-party content providers based on search parameters associated with the third-party content provider; receive search results from said search on each of said one or more third-party content providers; and provide said search results to said user.

According to an embodiment of the present invention, the scrapbook generation and provision module, processor, and communications means are further configured to: retrieve one or more user provided links associated with said stored content; and add one or more of said one or more user provided links to said search results.

According to an embodiment of the present invention, the scrapbook generation and provision module, processor, and communications means are further configured to: retrieve dynamic content results associated with said search results; and provide said dynamic content results to said user, wherein said dynamic content results comprise data that alters content associated with the search results based on content available that is more recent that content contained in said content associated with the search results.

According to an embodiment of the present invention, a method for generating and providing a media scrapbook includes the steps of: receiving a content storage request from a user; identifying, based on information contained in said content storage request, remote content stored at a remote content provider; retrieving said remote content from said remote content provider; parsing said remote content for associated content information; and storing, at least a portion of said remote content and said associated content information for later retrieval and use by said user.

According to an embodiment of the present invention, the method further includes the steps of: parsing user input data from said content storage request, wherein said user input data is selected from the group comprising user comments, user ratings, edits to prepopulated data and user tags; and storing said user input data in relation to the portion of said remote content and said associated content information.

According to an embodiment of the present invention, the method further includes the steps of: receiving a content exploration request from said user; identifying stored content associated with said content exploration request; retrieving said stored content; identifying one or more third-party content providers; generating search parameters for each of said one or more third-party content providers; executing a search on each of said one or more third-party content providers based on search parameters associated with the third-party content provider; receiving search results from said search on each of said one or more third-party content providers; and providing said search results to said user.

According to an embodiment of the present invention, the method further includes the steps of: retrieving one or more user provided links associated with said stored content; and adding one or more of said one or more user provided links to said search results.

According to an embodiment of the present invention, the method further includes the steps of: retrieving dynamic content results associated with said search results; and providing said dynamic content results to said user, wherein said dynamic content results comprise data that alters content associated with the search results based on content available that is more recent that content contained in said content associated with the search results.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

Figure 8B:
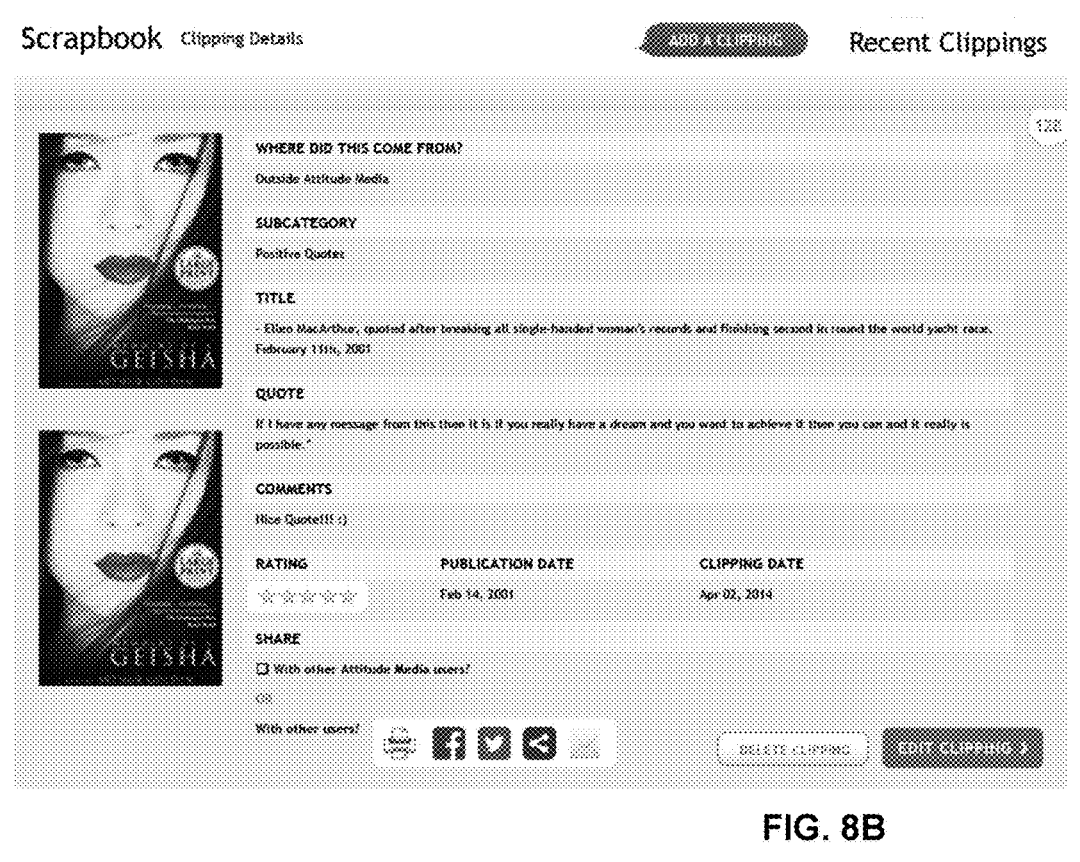

FIG. 8B is an illustration of exemplary graphical user interfaces (GUI) that could be displayed to users, in accordance with an embodiment of the present invention;

DETAILED SPECIFICATION

The present invention generally relates to a web-based system and method for searching, organizing, exploring and relating online content. Specifically, the present invention relates to a unique way to store and relate different types of media to each other. Embodiments of the present invention provide users the ability to identify and save content in a remote location where a remote computing device processes and uses the saved content to dynamically identify and update the content and secondary content associated with the content. Further embodiments of the present invention further allow for the organization and curation of content as well as provide a platform for searching and identifying new content based on the saved content.

Figure 1:
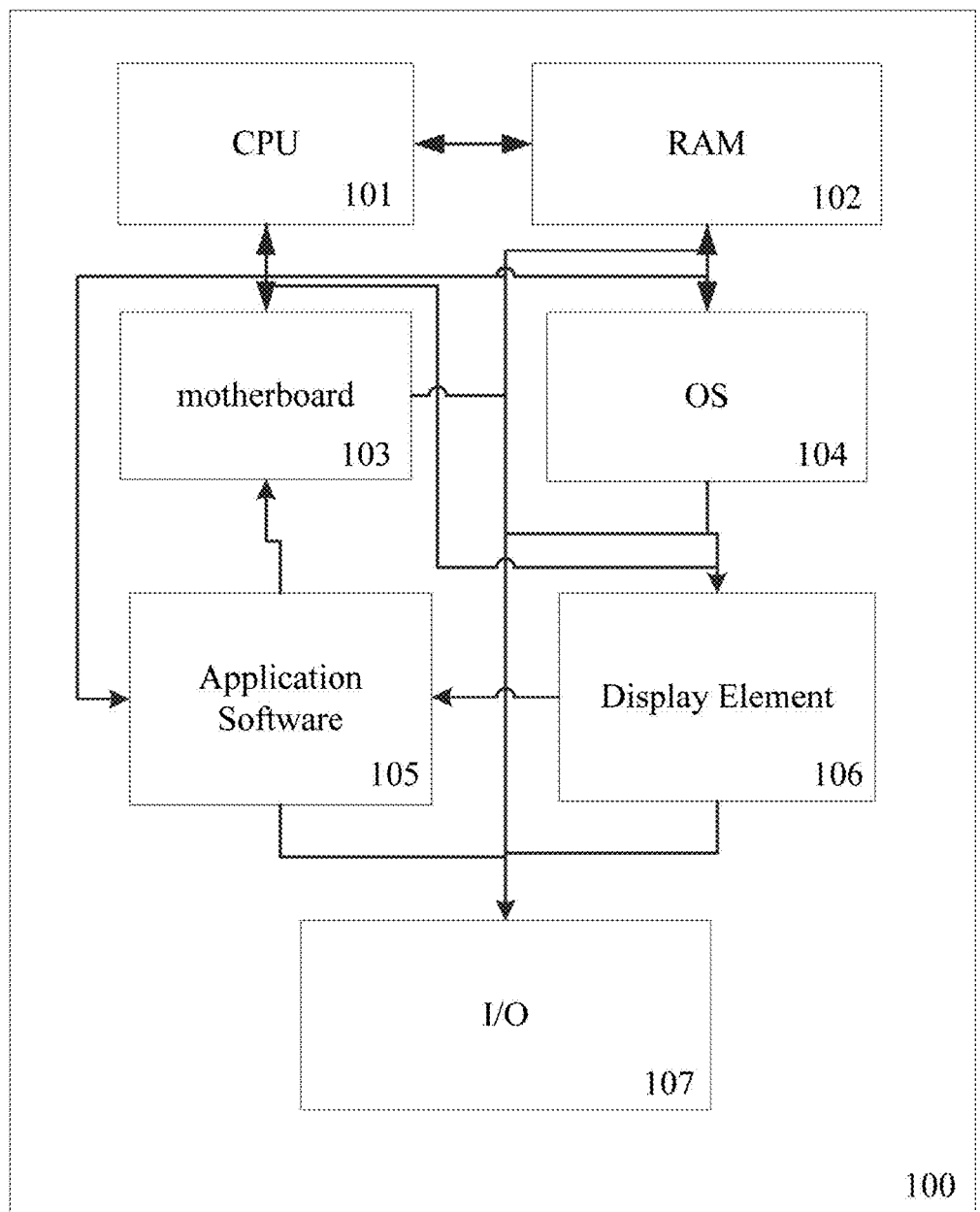
FIG. 1 illustrates a schematic overview of a computing device, in accordance with embodiments of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, display element 106 and one or more input/output devices/means 107. Examples of computing devices usable with embodiments of the present invention include, but are not limited to, personal computers, smart phones, laptops, mobile computing devices and tablet PCs and servers. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
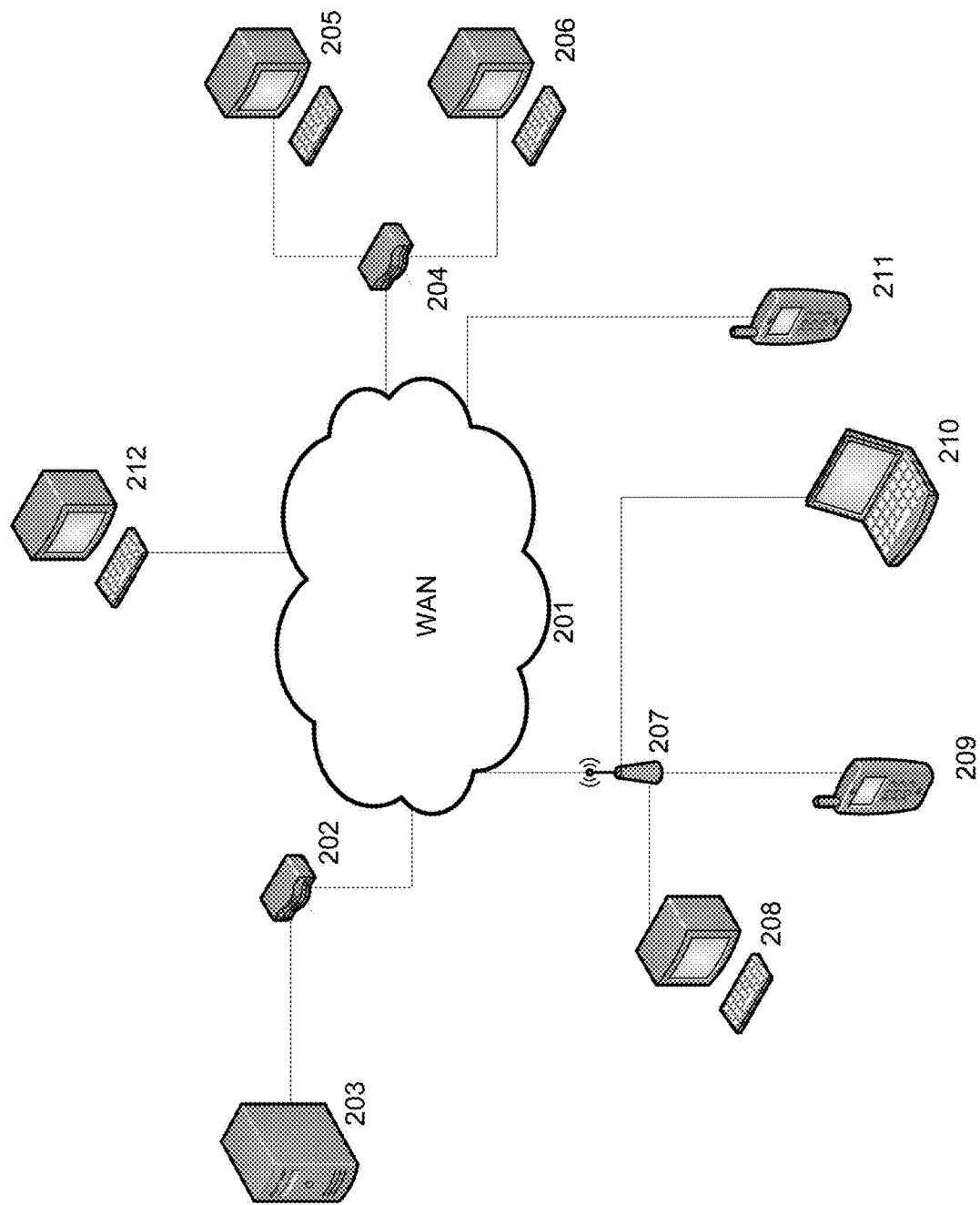
FIG. 2 illustrates a schematic overview of a network, in accordance with embodiments of the present invention.

Referring to FIG. 2, a schematic overview of a system in accordance with an embodiment of the present invention is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

Figure 3:
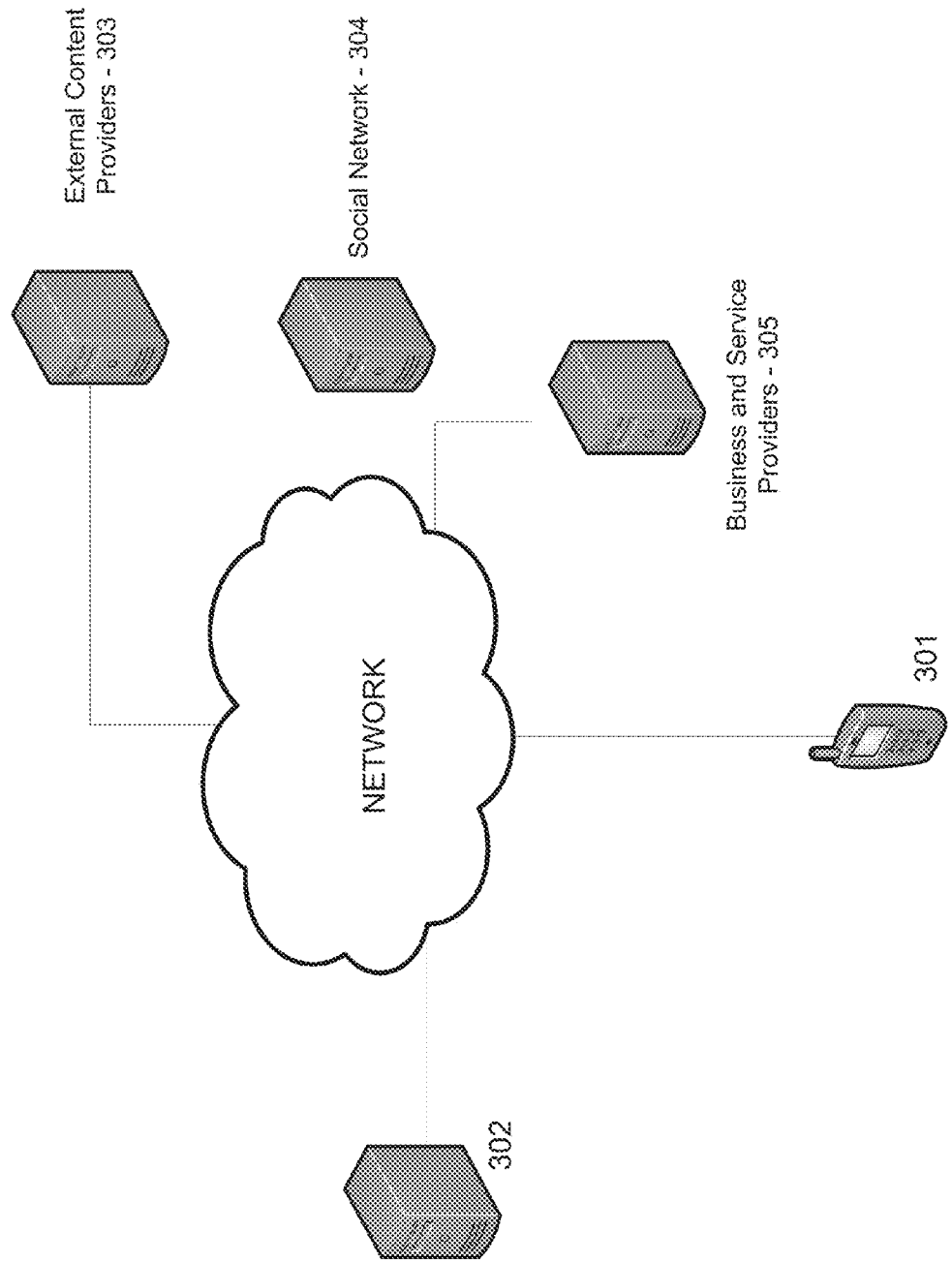
FIG. 3 illustrates a network schematic of a system, in accordance with embodiments of the present invention.

Turning now to FIG. 3, a continued schematic overview of a system in accordance with an embodiment of the present invention is shown. In FIG. 3, the system is shown as it may interact with users and other third party networks or APIs. For instance, a user of a mobile device 301 may be able to connect to application server 302. Application server 302 may be able to enhance or otherwise provide additional services to the user by requesting and receiving information from one or more of an external content provider API/website or other third party system 303, a social network 304, one or more business and service providers 305 or any combination thereof. Additionally, application server 302 may be able to enhance or otherwise provide additional services to an external content provider API/website or other third party system 303, a social network 304, or one or more business and service providers 305 by providing information to those entities that is stored on a database that is connected to the application server 302. One of ordinary skill in the art would appreciate how accessing one or more third-party systems could augment the ability of the system described herein, and embodiments of the present invention are contemplated for use with any third-party system.

Figure 4A:
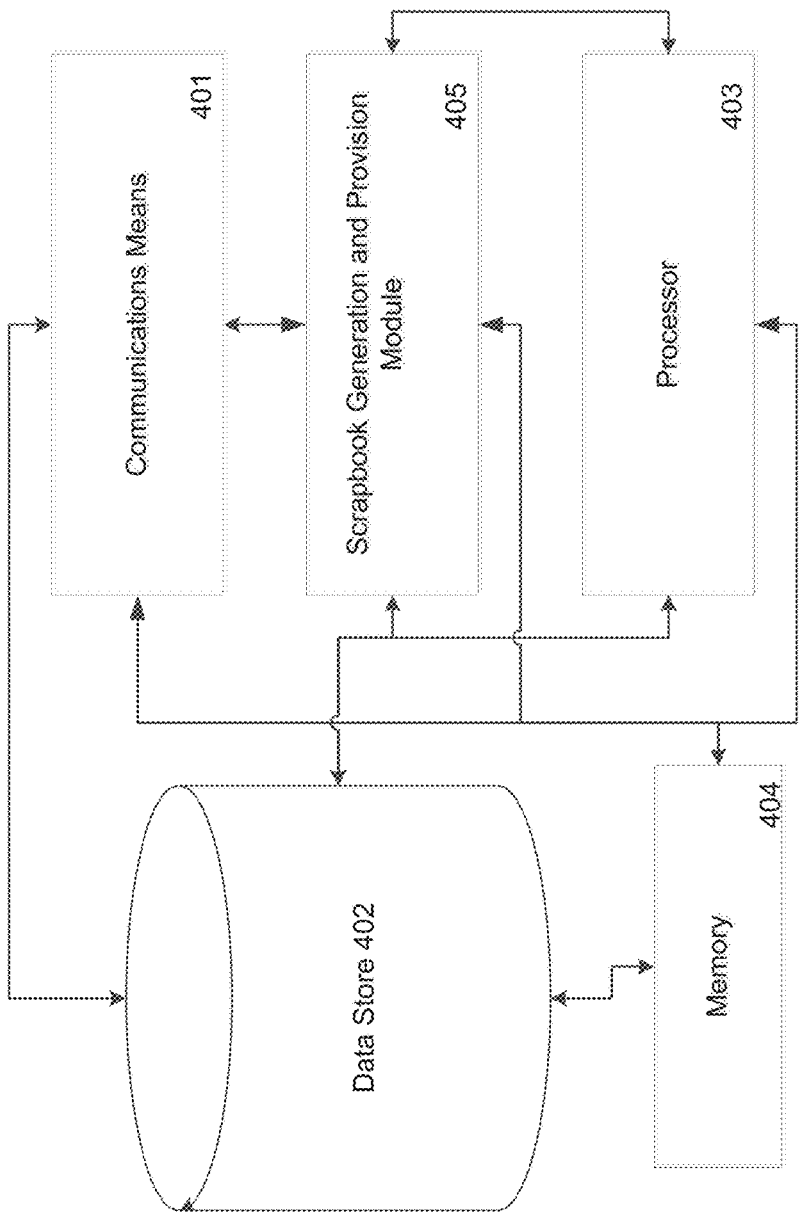
FIG. 4A illustrates a schematic of a system for generating and providing a media scrapbook, in accordance with embodiments of the present invention.
Figure 4B:
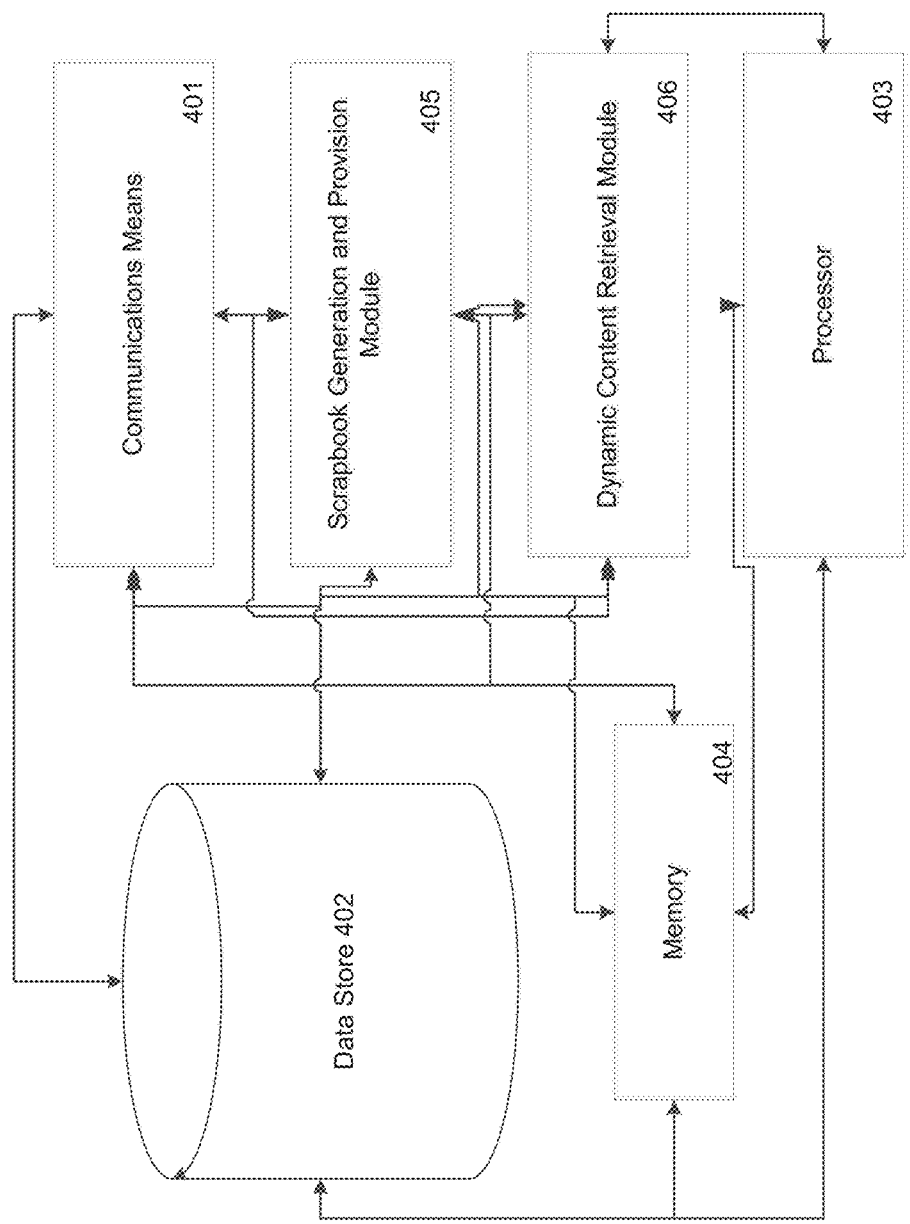
FIG. 4B illustrates a schematic of a system for generating and providing a media scrapbook, in accordance with embodiment of the present invention.

Turning to FIG. 4A, according to an embodiment of the present invention, a system for generating and providing a media scrapbook is comprised of one or more communications means 401, one or more data stores 402, a processor 403, memory 404, and a scrapbook generation and provision module 405. In FIG. 4B, according to an embodiment of the present invention, a system for generating and providing a media scrapbook is comprised of one or more communications means 401, one or more data stores 402, a processor 403, memory 404, a scrapbook generation and provision module 405, and a dynamic content retrieval module 406. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, any means for communicating data, voice or video communications over one or more networks or to one or more peripheral devices attached to the system. Appropriate communications means may include, but are not limited to, wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

According to an embodiment of the present invention, the scrapbook generation and provision module is configured to work in conjunction with other components of the system in order to provide functionality with respect to the generation and provision of media scrapbooks to users. Functionality provided the by generation and provision module include features related to the saving, storing, organization, exploration, curation and management of relationships between content, both internally and externally available to the system. Each function enumerated may be comprised of one or more series of processes configured to allow the system to provide variations on each of the provided functions. Further explanation of each function type and variation thereupon is detailed further herein.

According to an embodiment of the present invention, the dynamic content retrieval module is configured work in conjunction with other components of the system in order to provide functionality with respect to updating and maintaining currency of content stored or saved or otherwise associated with the system. For instance, the dynamic content retrieval module may provide for real-time or near real-time updates for schedules (e.g., television schedules, movie show times, events associated with saved/stored content such as book signings or concerts). Dynamic content retrieval functionality is detailed further herein.

According to an embodiment of the present invention, the system is configured to provide and allow for the provision of scrapbook functionality. By scrapbook functionality, it is intended that the system is capable of saving or storing content identified by a user of the system for consumption, curation or other use. In certain embodiments, content identified for saving or storage (collectively or interchangeably referred to as "saved" or "saving" herein) may be local to the system and be retrieved and provided to users entirely from local, connected or communicatively connected storage means or storage mediums. One of ordinary skill in the art would appreciate that there are numerous types of storage means and/or storage mediums that could be utilized with embodiments of the present invention, including, but not limited to, hard disk drives, solid state drives, non-transitory computer implemented memories, cloud storage mediums or any combination thereof.

In other embodiments, content to be saved may be remote from the system, such as contained on a remote website or other remote content provider (e.g., streaming music service, eCommerce provider, software application, software service provided via API). In these embodiments, the system retrieves the content via a communications connection to the remote content provider and stores some or all of the retrieved content for later retrieval and consumption, curation or other use by the user.

With respect to the content, when the content is local to the system, the system can associate the content with the user saving the content via an identifier. Local content will be comprised of a global unique identifier, allowing the content to be used and consumed by users of the system or, if security settings or privacy settings are in place, some subset of users allowed to access the content. For users who have saved the content, an additional identifier associated with the user may be associated with the content, providing for a link between the user and the content as well as any modifications or other interactions the user has had with the content, such as ratings, comments, ideas, content classification (e.g., content genre, content classifications), other interactions or any combination thereof. One of ordinary skill in the art would appreciate that there are numerous types of interactions that could be associated with the content with respect to individual users, and embodiments of the present invention are contemplated for use with any type of interaction.

With respect to the content that is provided from a remote content provider, the system may be configured to use a remote content identifier, such as a uniform resource locator (URL) to initiate population of the content within the system. The system may store the remote content identifier and any information associated with the remote content identifier, such as metadata (e.g., Open Graph data) that provides information such as title, thumbnail images, descriptions or other relevant information associated with the content. One of ordinary skill in the art would appreciate that there are numerous types of metadata and other information that could be retrieved and saved in association with the remote content identifier, and embodiments of the present invention are contemplated for use with any appropriate information or metadata type. Once the remote content is received, the user may also input and associate additional data with the remote content.

In either form, whether content is local or remotely provided, the system may provide the user the ability to modify prepopulated data (e.g., title, thumbnail, remote identifier). This allows users the ability to tailor and curate content with their own preferences.

Further, the system may allow the user to set a privacy level for each saved content. For instance, the user could set saved content to be: (i) public; (ii) only viewable by other users who are friends or otherwise acquainted with the user; (iii) available to groups of users identified by the user; or (iv) available to only a selected set of users identified by the user. One of ordinary skill in the art would appreciate that there are numerous methods for allowing saved content to be made available to subsets of individuals using a system, and embodiments of the present invention are contemplated for use with any appropriate privacy or other content limiting method.

According to an embodiment of the present invention, the system may allow a user to organize content based on categories. In a preferred embodiment, the system may provide the user to organize the content based on 15 total categories, 7 categories for local content and 8 categories for remote content. In this preferred embodiment, the seven categories for local content are: positive news; positive quotes; smart people say the stupidest things; outrage; books; media notes; and other. In this preferred embodiment, the eight categories for remote content are: movies, books, Internet, performing arts, art, periodicals, music and television (TV). One of ordinary skill in the art would appreciate that there are numerous ways to categorize information, and embodiments of the present invention could use any number of categories for either local or remote content, or both, and embodiments of the present invention are contemplated for use with any number of categories and any type of categories.

According to an embodiment of the present invention, in addition to the saving of content, the system provides users with the ability to search and/or explore saved content (both local and remote). Saved content is not limited to the content of a user, but rather a user can search or explore content: (i) in the user's own scrapbook; (ii) across scrapbooks made public by other users; (iii) recommended content or scrapbooks provided by the system (i.e., content saved but not necessarily associated with any particular user); (iv) by tags applied by users, readers or suggested by the system; or (v) any combination thereof.

According to an embodiment of the present invention, the system may provide exploration or search features based on commonalities amongst content the user has rated previously. The system may weigh content with commonalities the user has rated highly and find other content that has similar commonalities for provision to the user. Conversely, the system may weigh content with commonalities the user has rated poorly and determine not to provide such content to the user based on the previous ratings. Commonality points may include, but are not limited to, authors, directors, themes, genres, or any combination thereof. One of ordinary skill in the art would appreciate that there are numerous commonality points that may be utilized with embodiments of the present invention, and embodiments of the present invention are contemplated for use with any type of commonality.

According to an embodiment of the present invention, the system may also be configured to provide content to the user dynamically. For instance, the system may notify the user of new content released by an author/artist in which they have indicated interest through saved items. In another example, for art items saved from museum exhibits, the system may automatically organize the content by date/museum/exhibit. This allows for dynamic curation of content by the system in order to automatically assist the user in content curation.

According to an embodiment of the present invention, the system may be configured to save content with a unique hierarchy for each user. For instance, in a preferred embodiment, content could be stored in a hierarchy of the following format: (i) first all positive quotes are grouped together; (ii) second, subgroupings by common authors within quotes; (iii) third is a continuation based on subgrouping common authors within quotes associated with the subgroupings of (ii); and (iv) the hierarchy could continue for n levels where n is pre-determined by the system, the user or otherwise determined dynamically (e.g., based on available storage).

According to an embodiment of the present invention, the system may further be configured to provide search features for content located external to the system. Since certain external content providers may not be applicable for a given search, the system may be configured to identify appropriate external content providers prior to generating search parameters for such external content providers. For instance, a museum website may not be relevant for a search for content related to television shows, and as such, such museum website would be excluded from the search.

Further, since each external content provider has its own content access means (generally an API for accessing content), the system may be configured to generate search parameters for each external content provider. The system may take into account for various data points for the generation of search parameters, including, but not limited to: (i) best API to perform a certain function; (ii) terms of service of each API; (iii) resource limits on drawing on a certain API in a certain way; (iv) availability of caching content, and (v) any combination thereof. The system may further provide a tool that includes a includes a graphical user interface to show demands on each external content provider and process for not exceeding demand limits on any given external content provider.

According to a preferred embodiment of the present invention, once the system has generated the search parameters, the system executes a single search command (e.g., a single API call to a combination of APIs, including WIKIPEDIA, TWITTER, AMAZON, FACEBOOK, GOOGLE-NEWS, EBAY, and others external content providers) and provides a GUI to the user based on data received from the external content providers. In certain cases, a single search command may not be possible and the system runs the search commands independent from one another. Independent search commands may also provide the benefit of not hanging or otherwise failing if one of the external content providers is unresponsive or unavailable. One of ordinary skill in the art would appreciate that there are numerous methods for making API calls or other requests for external content, and embodiments of the present invention are contemplated for use with any appropriate means for requesting external content.

According to a preferred embodiment of the present invention, the system may be configured to generate GUI views based on the content received from the external content providers. For instance, the system may provide a summary view for a given content. Such summary view could display an overview of the content, such as images related to the content, individuals involved with the content (e.g., author, actors, musicians, bands, writers).

According to a preferred embodiment of the present invention, the system may provide a discussion view associated with the content provided. The discussion view may incorporate ongoing discussions related to or associated with the content, such as user reviews of content or user comments on the content or associated with the content.

According to a preferred embodiment of the present invention, the system may be configured to provide a view providing the user with media related to the content identified. Related media (or content) may include, but is not limited to, secondary content associated with an author of the content identified, content liked by others who like the content identified, content shared by others who like the content identified, content promoted by the system associated with the content identified, purchase options for the content (e.g., purchase from various eCommerce providers, online streaming of content), news associated with the content, sample content (e.g., sample chapter of a book, trailer for a movie) or any combination thereof. One of ordinary skill in the art would appreciate that there are numerous types of related media or content that could be provided in such a view, and embodiments of the present invention are contemplated for use with any appropriate type of related media for display in such a view.

According to a preferred embodiment of the present invention, the system may allow for users to add associations between two or more pieces of content. Content associations can be manually added by the users through interaction with the system and the content available to the users. For example, a relationship between a musician and an artist that the user feels are complimentary where the relationship is not otherwise automatically detectable by the system (e.g., artist is the musician). Manual or added links may be viewable by other users of the system. The system may further allow other users to comment on or remove manual links (at least as it pertains to their own scrapbook or content as provided by the system).

According to an embodiment of the present invention, the system provides the user the ability to link their scrapbook to other content. For example, a user can link their scrapbook using pull down menus for the 8 different media categories disclosed above, including adding comments about how media is related to each other. (i.e. A song that appears in a movie, a contributor that is common to two magazines, an art exhibition that illustrates a theme in a novel, etc.) In addition to the 8 basic categories of links, users will also be able to enter their own categories. This information is automatically used on an overview page to show linkages. In addition, on the overview page, by moving the cursor over an icon showing linkage, a pop up screen will appear showing how media are related, per the comments entered by the user.

According to a preferred embodiment of the present invention, the system may further be configured to provide a calendar feature for integrating content and events associated with the content into the calendar of a user. For instance, the calendar feature, as provided by a GUI to the user, may show upcoming events or shows related to artists, authors or others associated with content the user has saved. The calendar may be updated dynamically and provided with real-time or near real-time information. For instance, an API for television programming selections and/or similar APIs may be integrated with media reviews and other information to inform users of next play time for an episode of a television show. For instance, the GUI may show: (i) X show next appears on Tuesday at 8:00 PM (based on users location/time zone); (ii) all viewing options, including broadcast to air, cable and streaming providers; (iii) prices and availability for each option; (iv) X show has been cancelled (with related articles); (v) X show has no more episodes this season, but has been renewed by network and is scheduled to appear at a later date (with related articles); or (vi) any combination thereof. One of ordinary skill in the art would appreciate that there are any number of information points that could be displayed on such a GUI and embodiments of the present invention are contemplated for use with any appropriate information points.

According to a preferred embodiment of the present invention, the system may be configured to display content of different genres or category to the user in various GUIs. For instance, if the user is reviewing content associated with a movie, the system may also be configure to provide content related to a book on which movie is based, or other movies by same director or featuring same actor, on other media with common theme. Similarly, the system can be configured to show content based on other relationships, such as manual inputs, content tagged by other users, or any combination thereof.

According to a preferred embodiment of the present invention, the system may be integrated into a rewards system so that: (i) users can get reward points for saving, exploring, organizing or sharing content, (ii) users can get reward points for reaching certain milestones in their own scrapbook collections (e.g., adding n number of contents to scrapbook to a scrapbook, referring n number of users), (iii) users who purchase content through the system will get reward points based on those purchases; or (iv) any combination thereof. These rewards points could be used in conjunction with a rewards system known in the art. For instance, points could be redeemed for merchandise, travel, payment of subscription fees, virtual rewards (e.g., ribbons, trophies, badges), discounts from third party vendors, discounts on merchandise or other goods available through the system, or any combination thereof. One of ordinary skill in the art would appreciate that there are numerous types of rewards programs, and embodiments of the present invention are contemplated for use with any type of rewards program.

According to a preferred embodiment of the present invention, the system can analyze content consumed and give user certificates for completion of certain content (e.g., learning modules), as well as make suggestions as what would be required for completion. For instance, the system could be configured to compare content consumed to class syllabuses and grant learning credits based on successful consumption of the content.

According to a preferred embodiment of the present invention, the system can identify content that moves into the public domain. For instance, the system can identify the creator of content available or saved to the system, determine if he has been dead for a period long enough for content to enter into the public domain (e.g., expiration of applicable copyrights), then identify the content as public domain or not, along with screen of information about copyright laws and information about regulations of applicable jurisdictions copyrights laws (e.g., fair use, country in which copyright law applies, reference to copyright sources of info/lawyers, search federal copyright databases, search foreign copyright databases). Additionally, the system can use commonalities amongst content to suggest to users public domain content that shares commonalities with content not in the public domain and liked or otherwise rated highly by the user.

According to a preferred embodiment of the present invention, the system can be configured to search for commonalities between selections and ratings of content amongst users and suggest associations between consent and users. For instance, the system can identify characters from works of fiction/movies, books and provide users the opportunity to associate other users or people from the real world who resemble those characters, and share those associations with other users. The system can then finds content (e.g., news stories) and relate those to fictional plots from content. In this manner, the system generates additional content for consumption through such associations.

According to an embodiment of the present invention, when content associated with a user scrapbook item is a portion of the underlying content (e.g., part from a book, part from a movie), the system may provide users with the source of that content, such as exactly what page of book a quote appears on.

According to an embodiment of the present invention, the system may be configured to provide a puzzle page (i.e., GUI). The puzzle pages are repurposing of a scrapbook, or a portion thereof, for use in a game like manner by the user or amongst various users. Puzzle pages may be generated across an entire scrapbook or based on individual content pieces therein. For instance, once content is entered into scrapbook, a user can add it to a puzzle page by using a puzzle icon. All the info from scrapbook will automatically be carried over to the puzzle and presented in a different format.

According to an embodiment of the present invention, a puzzle page shows relationships between different pieces of content in a scrapbook using various methods of organization and illustration. For instance, a puzzle page may use: (i) a crossword style layout; (ii) an overlay layout; (iii) use relationships between different user accounts, such as what they have in common, and what content each user has to show a diagram or other juxtaposition of content between the two users; or (iv) any combination thereof. One of ordinary skill in the art would appreciate that there are numerous types of displays utilized for puzzle pages, and embodiments of the present invention are contemplated for use with any appropriate type of display for puzzle pages. The puzzle page may also show: (i) related content from any associated external content providers; (ii) one or more feeds illustrating the latest related news and related content online; or (iii) any combination thereof.

A purpose of the puzzle page is to allow for the organization and display of relationships amongst content between users, where commonalities exist between the content or where relationships have been identified by users and those identified relationships are shared with other users. Connecting the content in various ways acts much like connecting the various pieces of a puzzle.

According to an embodiment of the present invention, the system provides users the ability to share either the entire puzzle page, or any given content within the puzzle page. Further, the system is capable of providing a separate show function to share puzzle pages with users who have a user account with an external content provider. If content is entered in the scrapbook of a user, it does not need to have a prior linkage to an external content provider, but all items in a puzzle page must be linked by user if they do not have a previous scrapbook entry.

According to an embodiment of the present invention, when a user is on a puzzle page, the system may allow for the user to interact with an overview link of content on the puzzle page that will transfer the user to an overview page highlighting the content associated with the link.

According to an embodiment of the present invention, the system may automatically include in the puzzle page all public domain information available regarding any given subject. So, for example, if user has entered a specific book, the system will automatically provide the following kinds of data to user: publication date, publisher, page count, or any combination thereof. One of ordinary skill in the art would appreciate that there are numerous types of public domain information that could be utilized with embodiments of the present invention and embodiments of the present invention are contemplated for use with any type of public domain information.

Exemplary Embodiments

Figure 5:
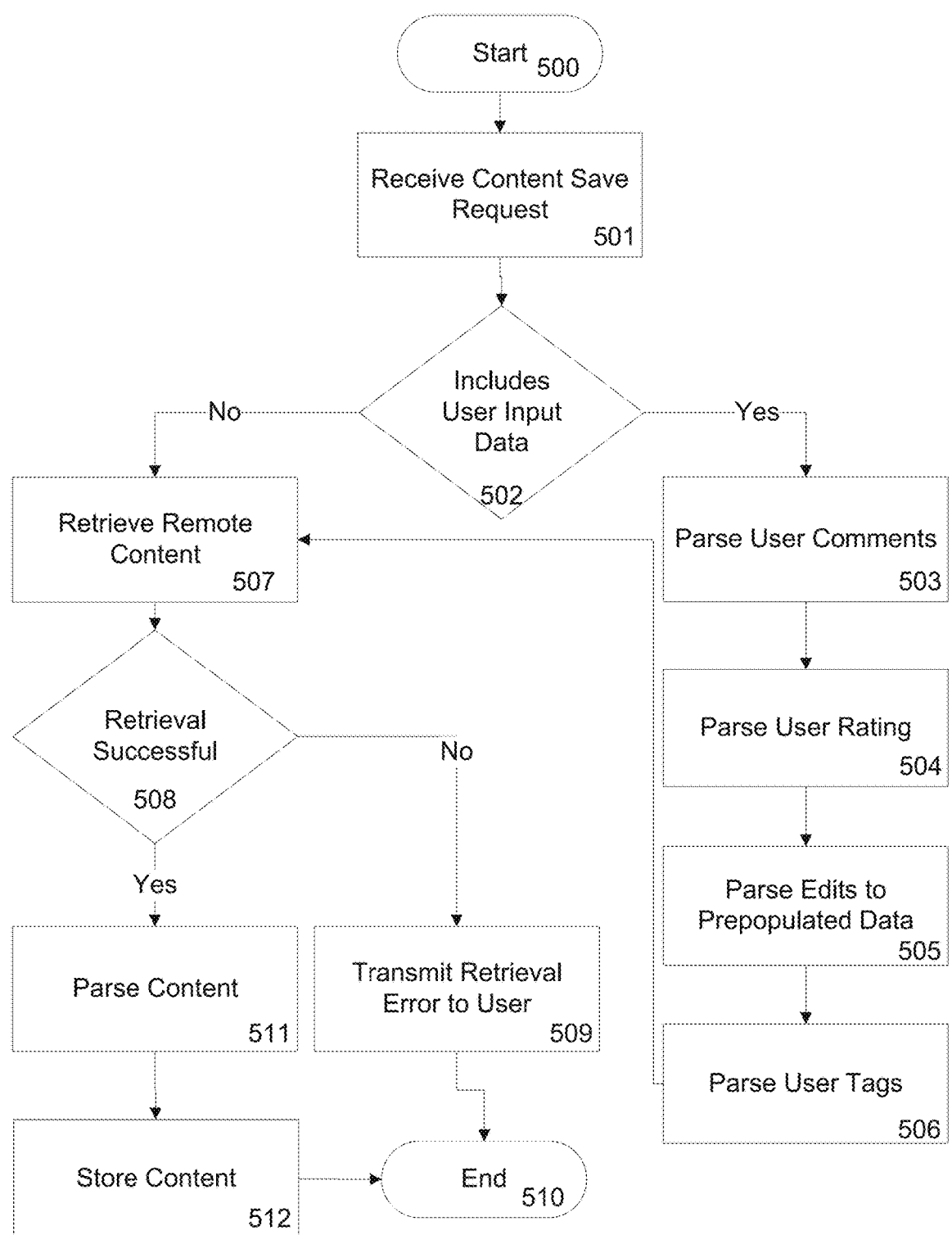
FIG. 5 is a process flow of an exemplary method in accordance with embodiments of the present invention.

Turning now to FIG. 5, an exemplary method for saving content is shown, in accordance with an embodiment of the present invention. The process starts at step 500 with a user sending a request to save content to their scrapbook as provided by the system. At step 501, the system receives the content save request and begins to parse the information contained in the request.

At step 502, a decisions is made as to whether the content save request includes user input data 502. User input data could be any data provided by the user that is to be associated with the content, such as user comments, user ratings, edits to prepopulated data, user tags or any combination thereof.

If there is user input data, the system sets about parsing and processing the user input data in individual chunks. At step 503, the system parses users comments for inclusion with the content. At step 504, the system parses any provided ratings for inclusion with the content. At step 505, the system parses edits to the prepopulated data for inclusion with the content. At step 506, the system parses any users tags for inclusion with the content.

At step 507, (whether the system previously processes user input data or not), the system then retrieves remote content identified in the content save request. As noted above, the content could be local or remote and identified to the system in a variety of ways. The step of this method process could be handled according to any of the manners detailed herein.

At step 508, the system determines if the content was retrieves successfully. If the content was not retrieved successfully (e.g., unresponsive external content provider), the system transmits the error to either the user, the system or both at step 509 and the process terminates at step 510.

If the content was retrieves successfully, the system, at step 511, parses the content for saving with the system. This step may also include augmenting the content with the user input data as previously or concurrently parsed by the system. At step 512, the system stores the content and the process terminates at step 510.

Figure 6:
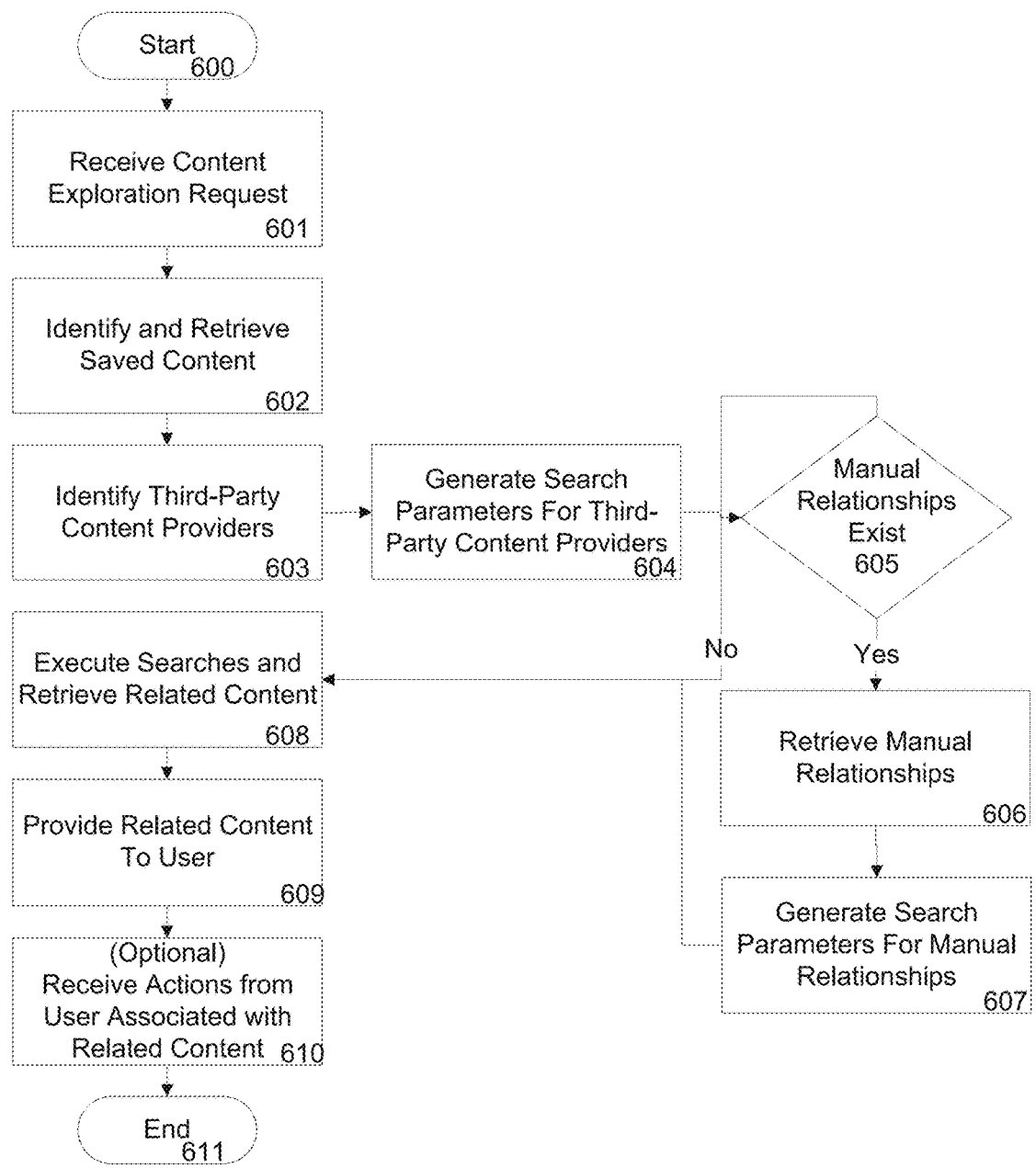
FIG. 6 is a process flow of an exemplary method in accordance with embodiments of the present invention.
Figure 7:
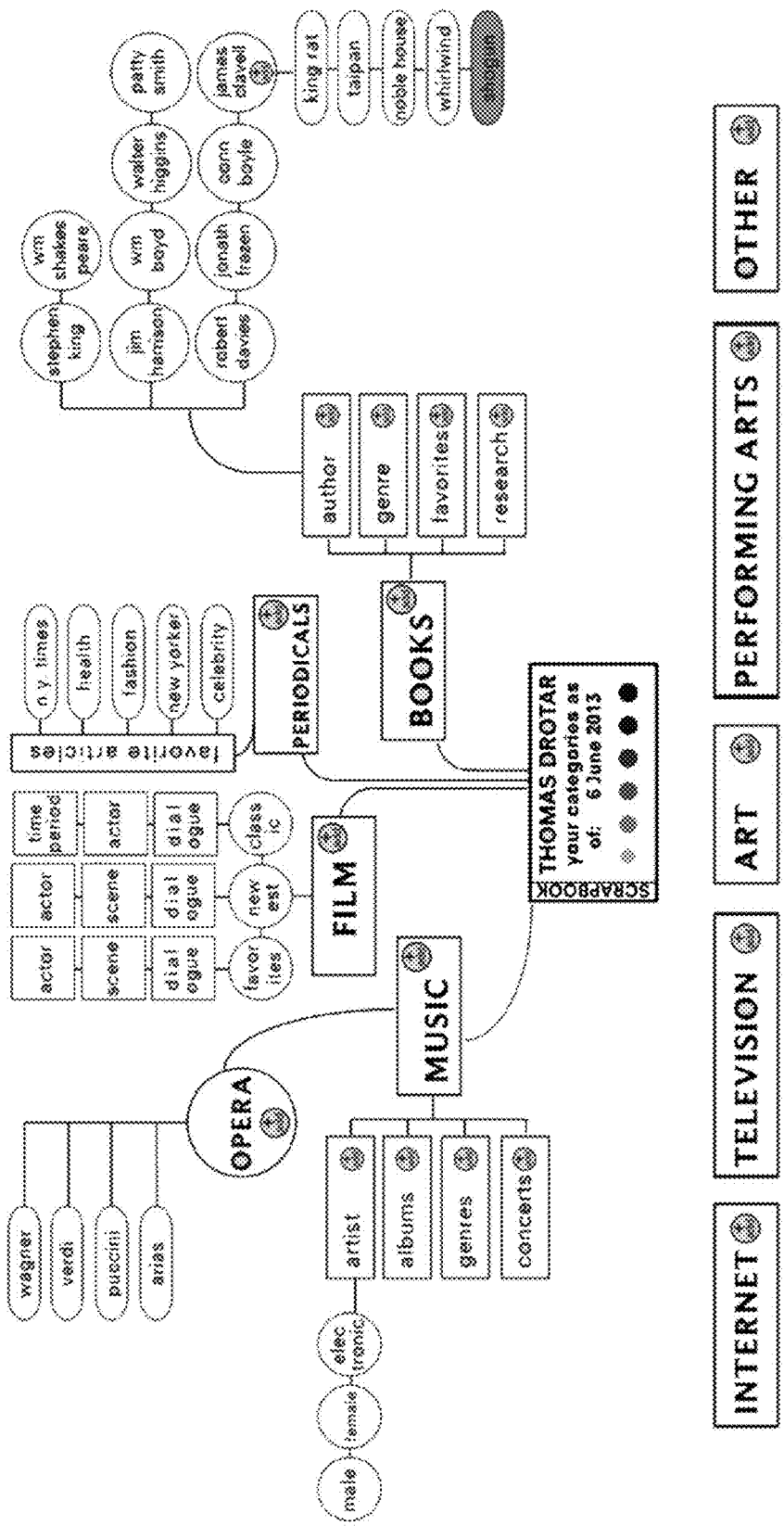
FIG. 7 is a schematic showing sample content associations in accordance with embodiments of the present invention.
Figure 8A:
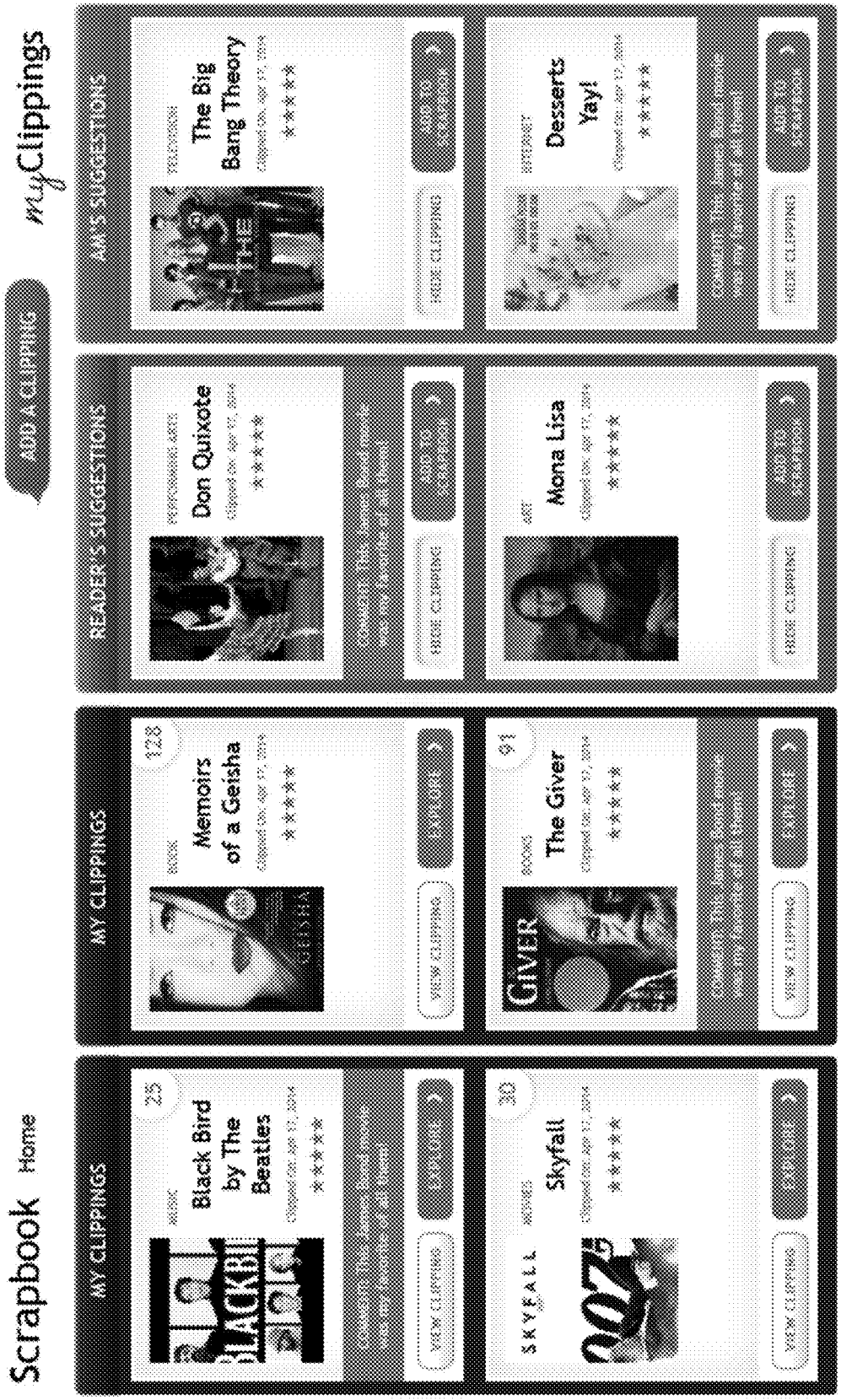
FIG. 8A is an illustration of exemplary graphical user interfaces (GUI) that could be displayed to users, in accordance with an embodiment of the present invention.
Figure 8C:
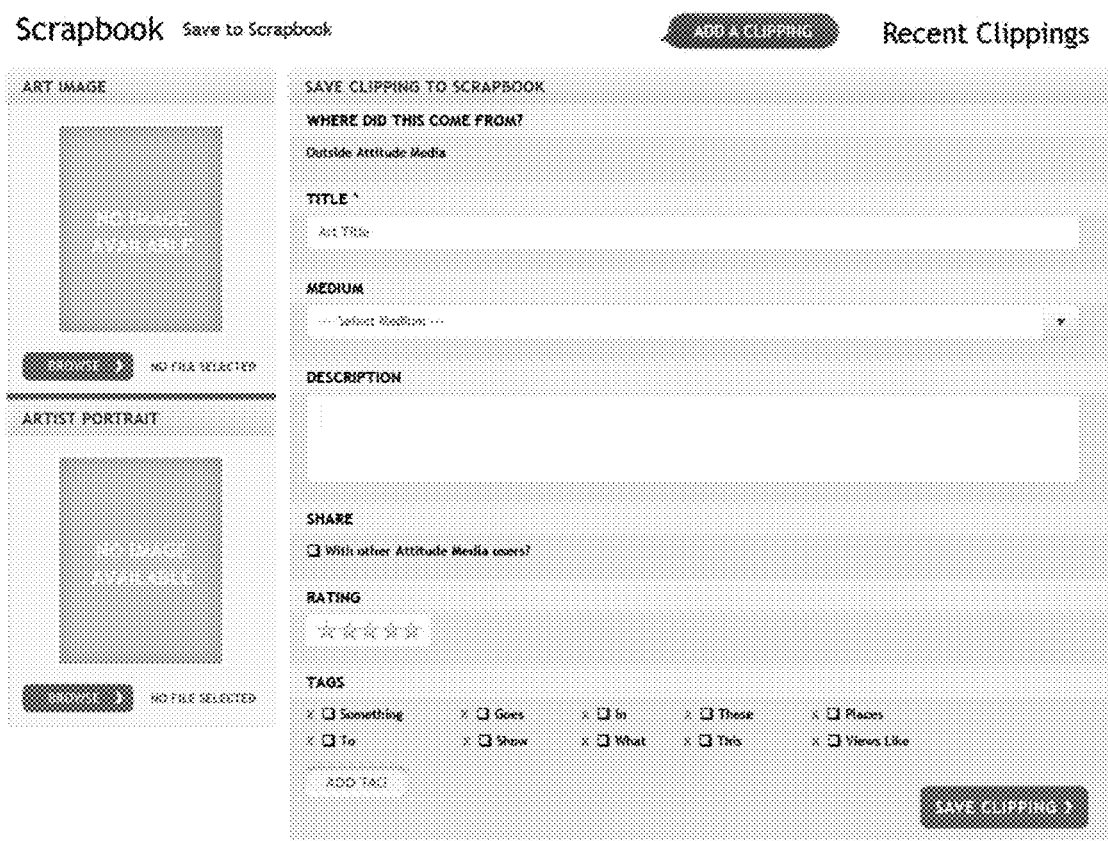
FIG. 8C is an illustration of exemplary graphical user interfaces (GUI) that could be displayed to users, in accordance with an embodiment of the present invention.
Figure 8D:
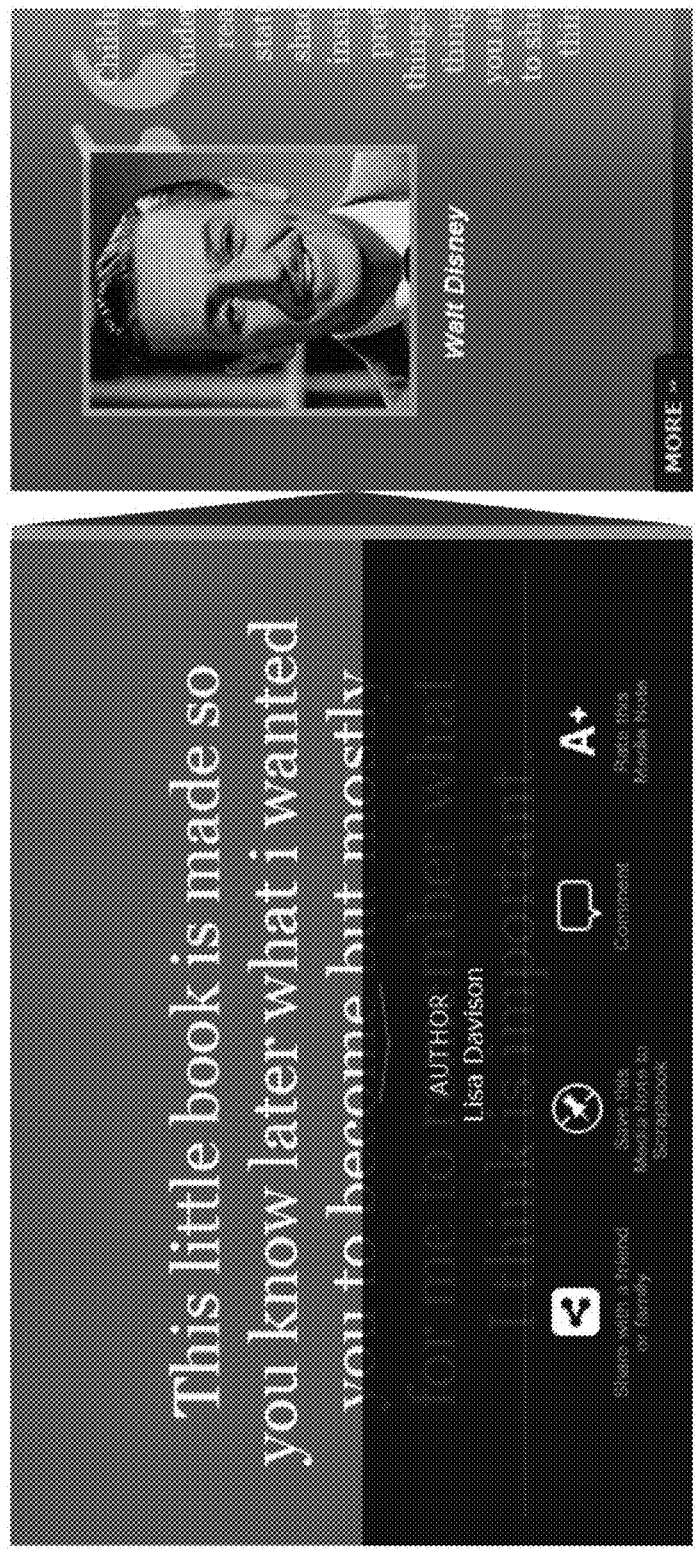
FIG. 8D is an illustration of exemplary graphical user interfaces (GUI) that could be displayed to users, in accordance with an embodiment of the present invention.
Figure 8E:
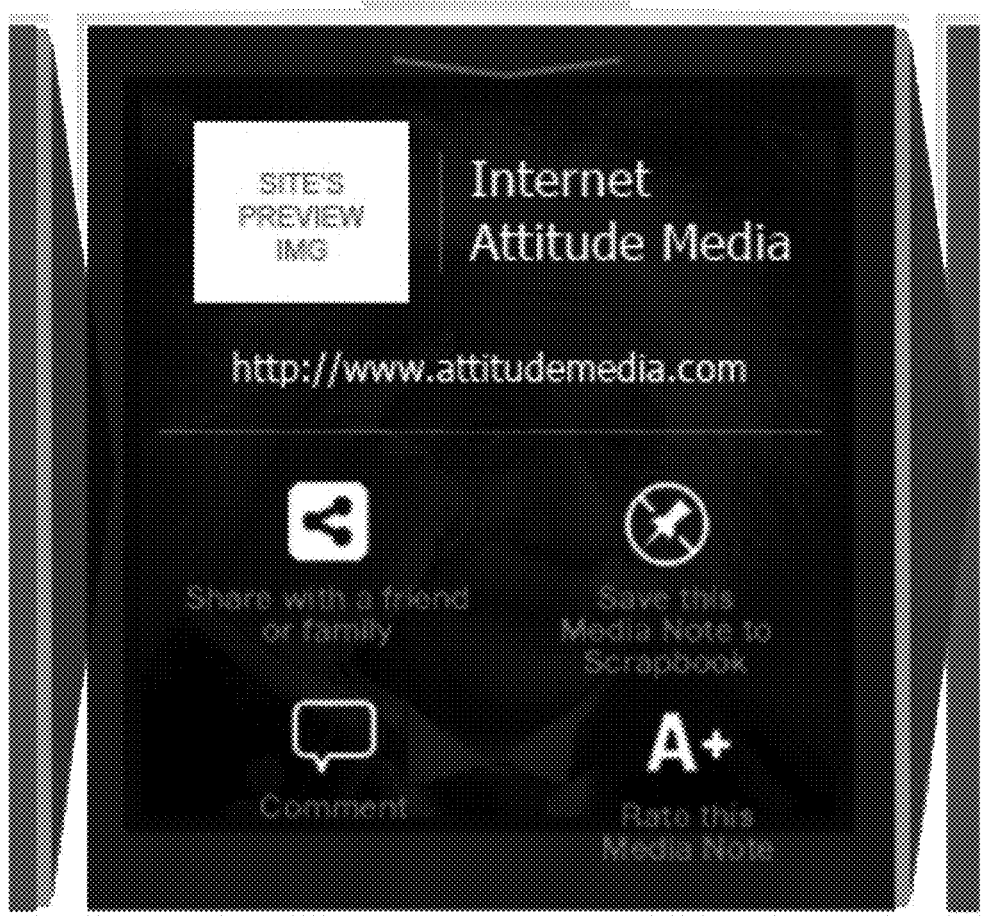
FIG. 8E is an illustration of exemplary graphical user interfaces (GUI) that could be displayed to users, in accordance with an embodiment of the present invention.

Turning now to FIG. 6, an exemplary method for exploring content is shown, in accordance with an embodiment of the present invention. The process starts at step 600 with a user sending a content exploration request to the system. At step 601, the system receives the content exploration request and begins to parse the information contained in the request.

At step 602, the system identifies and retrieves any saved content associated with the exploration request. This may include retrieving information from external content providers, solely retrieving information associated with content stored at the system or any combination thereof.

At step 603, the system identifies third-party content providers that will be used to service the content exploration request. The identification of third-party content providers or search providers is handled in a manner detailed herein and may include selecting or eliminating third-party providers based on appropriate or inappropriate relationships with the content being explored.

At step 604, the system generates search parameters for the identified third-party content/search providers. The generation of search parameters may be conducted in a manner as detailed in the present disclosure.

At step 605, the system determines if there are any manual or user added relationships that exist with respect to the content to be explored. If there are manual or user added relationships that exist, the system retrieves the manual or user added relationships (step 606). Where applicable, the system will also generate search parameters for the manual or user added relationships (step 607).

At step 608, whether manual or user added relationships were retrieved or not, the system executes the search based on the provided search parameters generated by the system and retrieves any content identified by or related to the search.

At step 609, the system provides the related/identified content to the user. Optionally, the system may also receive actions from the use associated with the related/identified content, such as saving of identified/related content or other interaction with the identified/related content (step 610). At this point, the process terminates at step 611.

Turning now to FIGS. 8A-8E, illustrations of exemplary graphical user interfaces (GUI) that could be displayed to users, in accordance with an embodiment of the present invention. The illustrations of FIG. 8A-8E are for representative purposes, and one of ordinary skill in the art would appreciate that any number of GUIs and other graphical representations that could be generated by the system, and embodiments of the present invention are contemplated for use with any GUI type or form and the generation of any such graphical representation.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for generating and providing a media scrapbook, the system comprising:
a scrapbook generation and provision module, comprising computer-executable code stored in non-volatile memory;
a processor; and
a communications means,
wherein said scrapbook generation and provision module, said processor, and said communications means are operably connected and are configured to:
dynamically update stored content;
identify other content related to the stored content based on commonality points and add the related other content to the stored content;
receive a content request from a user;
identify, based on information contained in said content request, remote content from one or more remote content providers;
automatically generate search parameters for optimal API's of said one or more remote content providers based on factors including: (i) best API to perform a designated function; (ii) API terms of service; and (iii) resource limits on using an API;
executing a single search command using the generated search parameters for the optimal API's; and
retrieve said remote content from said one or more remote content providers using the optimal API's in accordance with said search parameters.

2. The system of claim 1, wherein said scrapbook generation and provision module, said processor, and said communications means are further configured to:
parse user input data from said content request, wherein said user input data is selected from the group comprising user comments, user ratings, edits to prepopulated data and user tags; and
store said user input data in relation to a portion of said remote content and associated content information.

3. The system of claim 2, wherein said associated content information is selected from the group comprising uniform resource locator, internal content category, external content category, user content identifier and global unique identifier.

4. The system of claim 3, wherein the user content identifier is used to associate said content and said associated content information with said user.

5. The system of claim 3, wherein the global unique identifier is used to associate said content and said associated content information across all users.

6. The system of claim 1, wherein said scrapbook generation and provision module, said processor, and said communications means are further configured to:
receive a content exploration request from said user;
identify stored content associated with said content exploration request;
retrieve said stored content;
identify one or more third-party content providers;
generate search parameters for each of said one or more third-party content providers;
execute a search on each of said one or more third-party content providers based on search parameters associated with the third-party content provider;
receive search results from said search on each of said one or more third-party content providers; and
provide said search results to said user.

7. The system of claim 6, wherein said scrapbook generation and provision module, said processor, and said communications means are further configured to:
retrieve dynamic content results associated with said search results; and provide said dynamic content results to said user, wherein said dynamic content results comprise data that alters content associated with the search results based on content available that is more recent than content contained in said content associated with the search results.

8. The system, of claim 1, wherein a rating is assigned to each commonality point and said rated commonalities are used to find said other content.

9. A scrapbook data storage method comprising:
dynamically updating stored content;
automatically identifying other content related to the stored content based on commonality points;
identifying, based on information contained in a content request, remote content stored at one or more remote content providers;
automatically generating search parameters for optimal API's of said one or more remote content providers based on factors including: (i) best API to perform a designated function; (ii) API terms of service; and (iii) resource limits on using an API;
executing a single search command using the generated search parameters for the optimal API's; and
retrieve said remote content from said one or more remote content providers using the optimal API's in accordance with said search parameters.

10. The method of claim 9, wherein said stored content is a media scrapbook.

11. The method of claim 9, wherein said related content comprises information about events associated with the stored content.

12. The method of claim 9, wherein pieces of said stored content are weighted according to said commonality points.

13. The method of claim 9, wherein said commonality points are rated by a user.

14. The method of claim 9, wherein a user is automatically notified of newly released content related to the stored content.

15. The method of claim 9, wherein said stored content is automatically organized by date, museum where said content is on display, and exhibit.

16. The method of claim 9, wherein relationships are automatically detected between different pieces of the stored content.

17. The method of claim 16, wherein said relationships are defined by a user.

* * * * *